United States Patent [19]

Nakamura et al.

[11] Patent Number: 5,027,356

[45] Date of Patent: Jun. 25, 1991

[54] ERROR CONTROL SYSTEM

[75] Inventors: Makoto Nakamura, Kanagawa; Tomoko Kodama, Yokohama, both of Japan

[73] Assignee: Kabushiki Kaisha Toshiba, Kawasaki, Japan

[21] Appl. No.: 320,442

[22] Filed: Mar. 8, 1989

[30] Foreign Application Priority Data

Mar. 9, 1988 [JP] Japan ................................ 63-053620

[51] Int. Cl.$^5$ ............................................. G08C 25/02
[52] U.S. Cl. ...................................................... 371/32
[58] Field of Search ................................ 371/32, 33, 35

[56] References Cited

U.S. PATENT DOCUMENTS

| 3,421,147 | 1/1969  | Burton et al.   | 371/32 |
| 3,646,518 | 2/1972  | Weinstein       | 371/35 |
| 4,304,001 | 12/1981 | Cope            | 371/32 |
| 4,439,859 | 3/1984  | Donnan          | 371/32 |
| 4,779,274 | 10/1988 | Takahashi et al.| 371/32 |
| 4,829,526 | 5/1989  | Clark et al.    | 371/35 |

OTHER PUBLICATIONS

Fujiwara et al., "Feedback Error Control System with Limited Number of Retransmissions", Proceedings of the Third Symposium on Information Theory and Its Application, Dec. 1980, pp. 328-332.

Primary Examiner—Charles E. Atkinson
Attorney, Agent, or Firm—Foley & Lardner

[57] ABSTRACT

An error control system retransmits a portion of information if an error occurs on the portion in transmitting the information. The retransmission is carried out in the steps of dividing information into information blocks each composed of one or a plurality of bits; transmitting the information blocks from a transmitter to a receiver in one of a plurality of first transmission areas, the first transmission areas being arranged at predetermined time intervals on a time axis, each of the first transmission areas having a first predetermined time length; judging whether or not errors have occurred on the information blocks in transmitting them; transmitting requests for retransmitting information blocks which have been judged to have errors, from the receiver to the transmitter; and retransmitting the information blocks for which the retransmission requests have been made, from the transmitter to the receiver in one of a plurality of second transmission areas, the second transmission areas being arranged alternately with the first transmission areas on the time axis, each of the second transmission areas having a second predetermined time length.

12 Claims, 3 Drawing Sheets

ERROR CONTROL SYSTEM

BACKGROUND OF THE INVENTION

(1) Field of the Invention

The present invention relates to an error control system which can reliably transmit digital information signals by retransmitting a signal if errors occur in receiving the signal. Particularly, the present invention relates to an error control system capable of transmitting information in real time.

(2) Description of the Prior Art

To reduce the influence of errors in transmitting information through transmission lines, various kinds of error control systems have been proposed. Among them, an automatic repeat request (ARQ) system, which provides high system reliability, is relatively simple to construct, compared with other error correction systems, such as a forward error correction (FEC) system. The ARQ system is, therefore, widely employed in various communication systems, such as satellite communications.

To embody the ARQ system, various systems, such as a G-Back-N system and a selective repeat system, have been proposed. However, these conventional systems have drawbacks in that retransmission frequency increases and throughputs of the systems drastically reduce, when channel conditions are not good. Particularly, the selective repeat system needs a memory for temporarily storing a fixed amount of information on its receiving side to prevent the order of reception signals from changing due to signals retransmitted later on. The system should also be controlled, so that transmission of new information is stopped if the number of retransmission requests increases and exceeds the capacity of the memory. This may further deteriorate the transmission efficiency of the system. In addition, as the retransmission frequency increases, transmission delay, namely, the time period from outputting a signal from an information source to receiving the signal at a destination, inevitably increases.

Accordingly, conventional ARQ systems are useful only for transmitting data which allow relatively large transmission delay, such as computer data. Conventional ARQ systems are hardly applicable for transmitting data such as voice information and image information which is transmitted in real time.

As described in the above, conventional error control systems have drawbacks that transmission delay is increased when the channel condition is not good and retransmission frequency increases. Therefore, the conventional systems are applicable only for the cases allowing relatively large transmission delay caused by retransmission, and not applicable for cases requiring real-time transmission.

SUMMARY OF THE INVENTION

An object of the present invention is to provide a method of error control adopting a retransmission method to realize a real-time transmission of the information with a simple system.

In order to accomplish this object, the present invention provides a method of error control in which, when an error occurs in transmitting a certain part of information, the part is retransmitted while a fixed throughput is secured to realize the real-time transmission of information. In the method, the following steps are carried out:

forming an information block composed of one or a plurality of bits from the information;

transmitting the information block from transmitter means to receiver means in one of a plurality of first transmission areas, the first transmission areas being arranged at predetermined time intervals on a time axis and each of the first transmission areas having a first predetermined time length;

judging whether or not an error has occurred on the information block;

retransmitting, when it is judged that an error has occurred on the information block, the information block from the transmitter means to the receiver means in one of a plurality of second transmission areas, the second transmission areas being arranged alternately with the first transmission areas on the time axis and each of the second transmission areas having a second predetermined time length.

These and other objects, features and advantages of the invention will become apparent from the following detailed description of the invention with reference to the accompanying drawings.

DETAILED DESCRIPTION OF THE PREFERRED EMBODIMENTS

Figure 1:
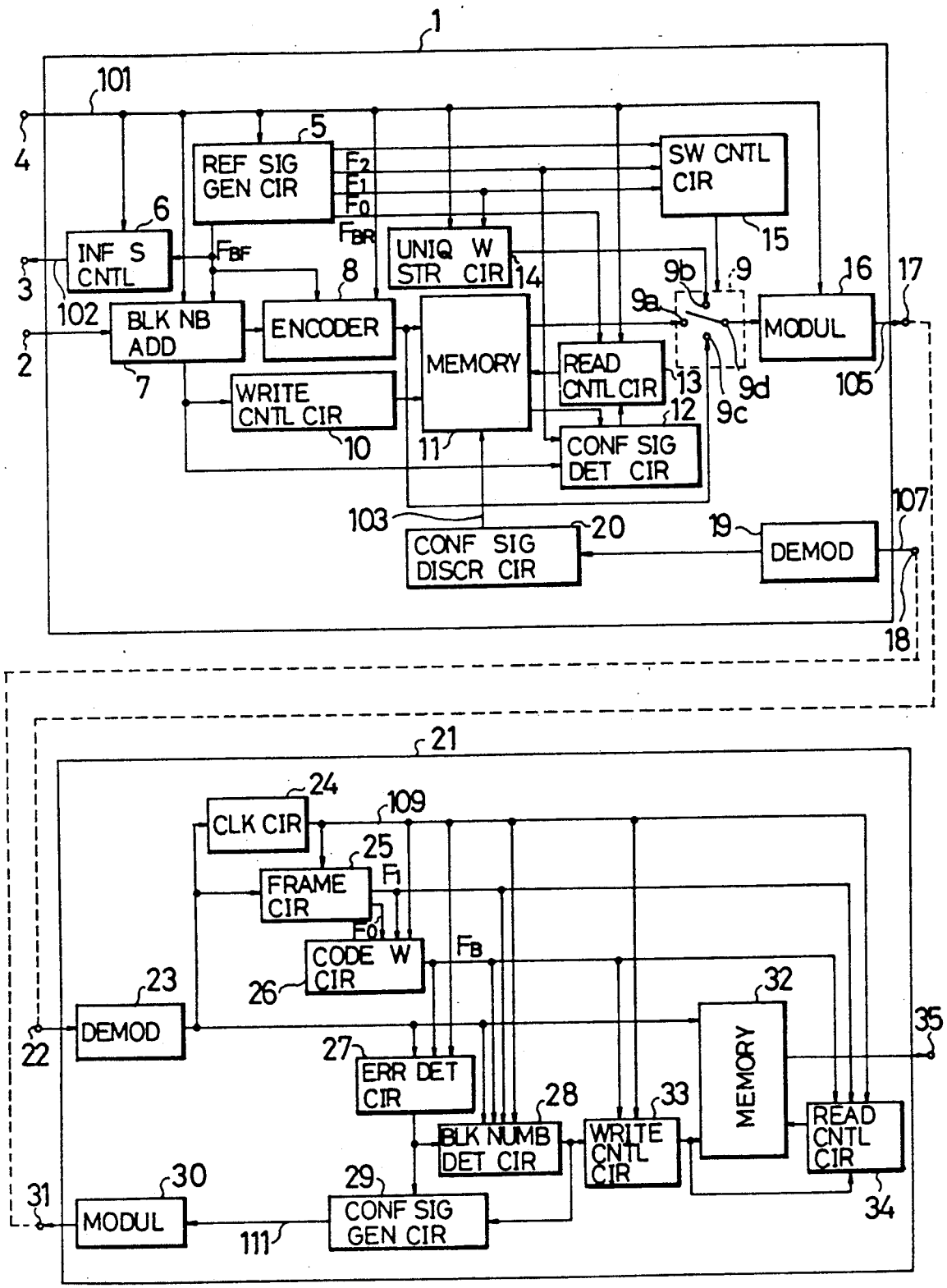
FIG. 1 is a block diagram showing a transmitter and a receiver according to an embodiment of an error control system of the present invention.

FIG. 1 is a block diagram showing a transmitter and a receiver according to an embodiment of an error control system of the present invention.

In a transmitter 1, an input terminal 2 is connected to an information source to receive information, such as image data and voice data, as a series of information blocks. An output terminal 3 is also connected to the information source to output control signal sent from an information source controller to be described later to the information source. An input terminal 4 receives system clock synchronous signal 101.

Figure 2:
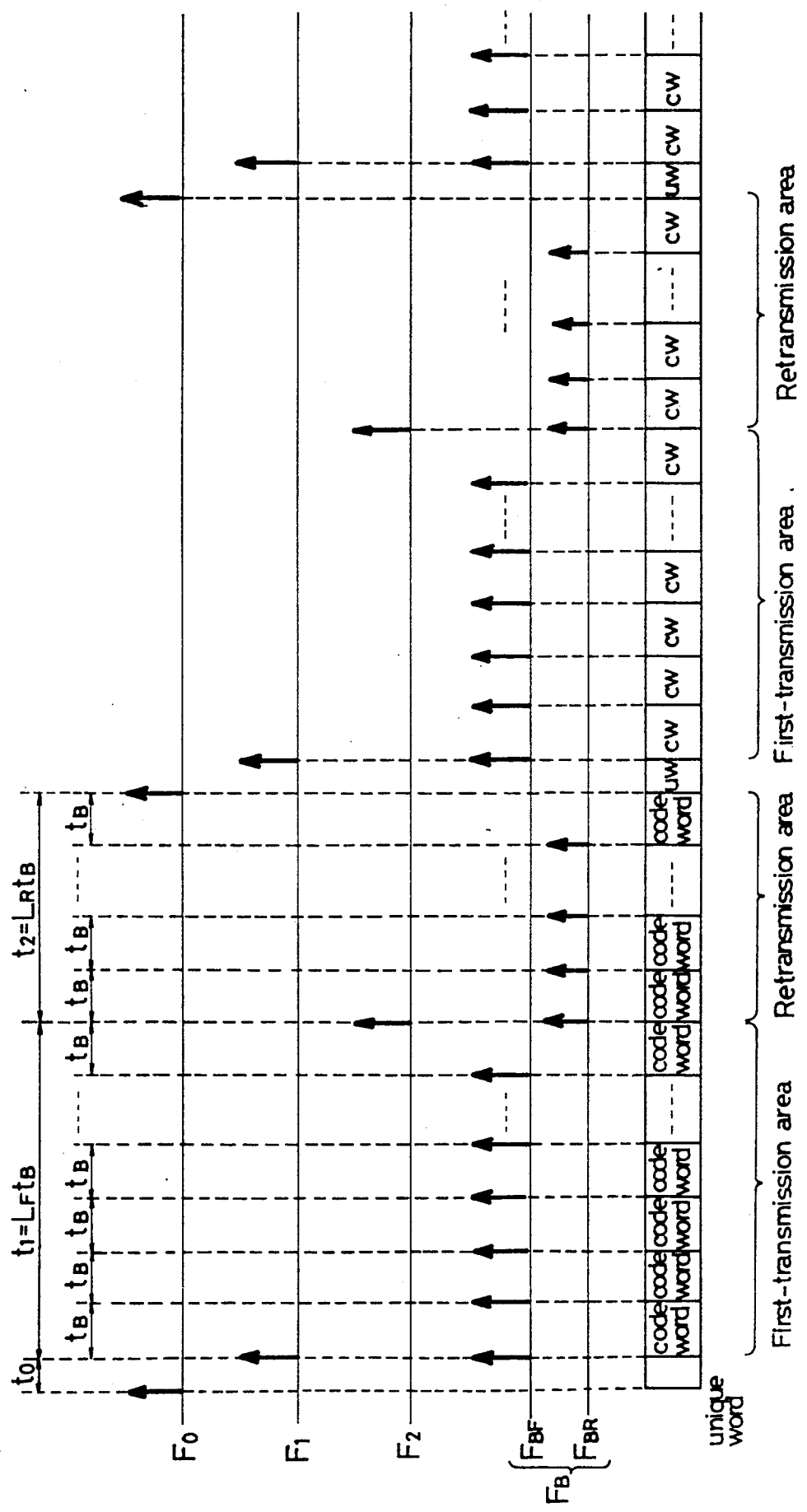
FIG. 2 is a timing chart showing timing signals employed in the transmitter and receiver of FIG. 1 and transmission signals.

A reference signal generating circuit 5 receives a clock synchronous signal 101 and, based on this signal, generates and outputs timing signals $F_0$, $F_1$, $F_2$, $F_{BF}$ and $F_{BR}$, shown in FIG. 2.

The timing signal $F_0$ controls the timing of transmitting a unique word. The unique word has a predetermined bit pattern and is used for acquiring frame synchronization. Each frame consists of a succession of an area for a unique word transmission, a first transmission area, and a retransmission area.

The timing signal $F_1$ controls the timing of transmitting the first one of $L_F$ code words to be transmitted in one of first transmission areas where each information block as a code word is transmitted for the first time.

The timing signal $F_2$ controls the timing of transmitting the first one of $L_R$ code words to be informatioon blocks on which errors have occurred in previous transmission and retransmission are retransmitted.

The timing signal $F_{BF}$ controls the timing of transmitting each of $L_F$ code words to be transmitted in each first transmission area, while the timing signal $F_{BR}$ controls the timing of transmitting each of $L_R$ code words to be transmitted in each retransmission area.

As shown in FIG. 2, the time region in which signal transmission is executed comprises a plurality of the first transmission areas and a plurality of the retransmission areas. The first transmission areas and retransmission areas are alternately arranged on a time axis at a predetermined period of $(L_F+L_R) t_B+t_0$ Here, "$t_B$" and "$t_0$" are times needed for transmitting one information block and a unique word, respectively.

The larger the ratio $L_R/(L_F+L_R)$, the more reliable is the transmission. But the larger the ratio, the larger the band width expansion ratio becomes. Therefore, the ratio is set to be nearly equal to $\epsilon_B$ to use the retransmission areas most effectively, $\epsilon_B$ being an average block-error occurring rate , i.e., the probability of at least one bit error occurring in the transmission of one information block.

The information source controller 6 receives the clock synchronous signal 101 and timing signal $F_{BF}$, and generates a signal 102. The signal 102 controls the information source such that the information source outputs an information block comprising a series of $k_0$ bits to the input terminal 2 in response to the timing signal $F_{BF}$ and in synchronism with the clock synchronous signal 101.

A block number adding circuit 7 receives respective information blocks from the input terminal 2. The block number adding circuit 7 uses the clock synchronous signal 101 and timing signal $F_{BF}$ to generate a block number comprising "$k-k_0$" bits for each of the received information blocks. The generated block number is added to the corresponding information block to form an information block of "k" bits, which is sent to an encoder 8.

The encoder 8 receives the k-bit information block from the block number adding circuit 7 and calculates a CRC (Cyclic Redundancy Check) symbol of "n-k" bits as error control information for the received k-bit information block. Thus, the encoder 8 generates a code word of "n" bits.

When a pulse interval of the clock synchronous signal 101 is "tc", an interval "$t_B$" of the pulses of the timing signal $F_{BF}$ or $F_{BR}$ shown in FIG. 2 is "$t_B=n.tc$." The encoder 8 uses an LFSR (Linear Feedback Shift Register) to generate a CRC. To start the LFSR each time an information block is input from the block number adding circuit 7, the encoder 8 uses the timing signal $F_{BF}$. And, to shift the LFSR bit by bit, the encoder 8 uses the clock synchronous signal 101.

Respective code words generated by the encoder 8 are sent to a terminal 9c of a switching circuit 9 and, at the same time, stored in a memory 11 under control of a write control circuit 10.

The write control circuit 10 writes the respective code words in the memory 11 using the respective block numbers added in the block number adding circuit 7 as addresses.

The memory 11 stores $2^{k-k_0}$ code words and their confirmation values. Each of the confirmation values is determined according to a confirmation signal 103 discriminated by a confirmation signal discriminating circuit 20 to be explained later. The confirmation value is "0" if the corresponding code word has correctly been accepted by the receiver, and the confirmation value is "1" if the corresponding code word has not been accepted correctly by the receiver, i.e., if an error has occurred, e.g., in transmitting the corresponding code word.

Figure 3:
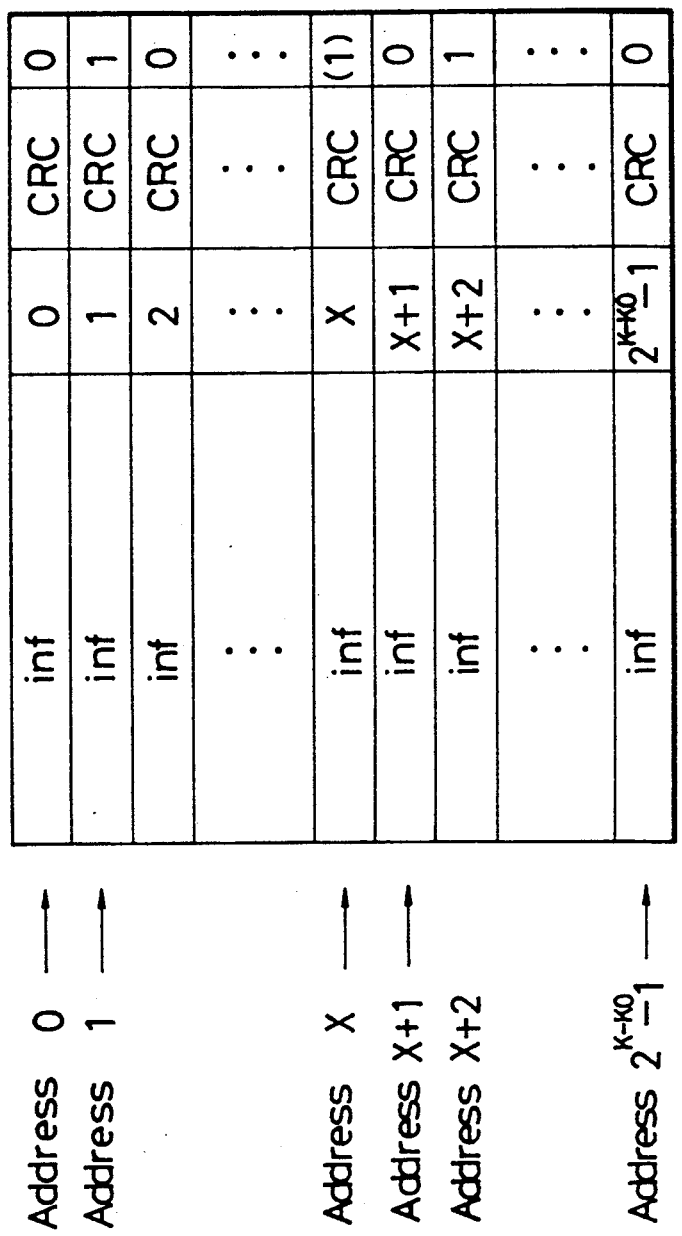
FIG. 3 is a view showing an information storing state of a memory arranged in the transmitter of FIG. 1.

FIG. 3 schematically shows the information storing state of the memory 11. A reference mark "inf" in the first column represents specific information contained in the corresponding code word. The second column of the figure contains block numbers, the third column contains CRC symbols, and the fourth column contains the confirmation values of respective code words. The memory 11 stores the information blocks with increasing addresses in the order of transmission of the information blocks to the encoder 8.

A confirmation signal detecting circuit 12 detects code words having confirmation values of "1". Detection starts after the elapse of a predetermined time from a pulse of the timing signal $F_1$ and before a following pulse of timing signal $F_2$. The timing of starting the detection is set such that the detection which needs a fixed time period is completed before a following pulse of timing signal $F_2$. When an address of a code word to be written in the memory 11 just before a pulse of the timing signal $F_2$ is "x", the detection is carried out in an ascending order from a code word of address "x+1". Namely, the detection is carried out from the oldest stored code word among code words currently stored in the memory 11. After the code word of address "$2^{k-k_0} -1$", the code word of address "0" is detected.

The reason why the detection is carried out in such an order is because the method of the invention puts a limit on the number of retransmission to be made on a code word erroneously transmitted before. Therefore, code words older in the storing in the memory 11, and which can be considered to have a higher possibility of several retransmission failures, are given priority in further retransmission.

The confirmation signal detecting circuit 12 receives an address of a code word which has been written in the memory 11 just before starting the detection, from the block number adding circuit 7 and, based on this address, calculates the address "x+1", mentioned before.

A read control circuit 13 receives addresses of code words which have been detected to have confirmation values of "1", from the confirmation signal detecting circuit 12 and stores the addresses. The maximum number of addresses to be stored at a time in the read control circuit 13 is $L_R$. If the number of detected code words exceeds $L_R$, addresses of the first $L_R$ code words starting from the oldest stored one in the memory 11 are stored in the read control circuit 13.

If no code word to be retransmitted is detected in the above mentioned detection by the confirmation signal detecting circuit 12, addresses of code words whose confirmation values are not yet determined at the time of detection are stored in the read control circuit 13. The code words with confirmation values not yet determined are represented in FIG. 3 as code words with confirmation values "(1)".

The maximum $L_R$ code words whose addresses have been stored in the read control circuit 13 are retransmitted in one retransmission area which starts at the following pulse of timing signal $F_2$. Namely, the code words whose addresses have been stored in the read control circuit 13 are sequentially read out of the memory 11 according to the pulses of timing signals $F_{BR}$ and sent bit by bit to a terminal 9a of the switching circuit 9 under the control of the clock synchronous signal 101. If the number of addresses stored in the read control circuit 13 is less than $L_R$, code words whose addresses are stored in the read control circuit 13 are repeatedly read, so that $L_R$ code words in total are sent to the terminal 9a.

Since the maximum retransmission number is fixed, older code words stored in the memory 11 are first and repeatedly read. As a result, overall reliability of signal transmission is improved.

A unique word storing circuit 14 stores a signal sequence of a unique word and sends the sequence to a terminal 9b of the switching circuit 9 whenever a pulse of the timing signal $F_0$ is input. The signal sequence of the unique word is sent bit by bit to the terminal 9b under the control of the clock synchronous signal 101.

A switch control circuit 15 receives the timing signals $F_0$, $F_1$ and $F_2$ from the reference signal generating circuit 5 to control the switching circuit 9 such that a terminal 9d of the switching circuit 9 is connected to the terminal 9b during an interval between a pulse of timing signal $F_0$ and a following pulse of timing signal $F_1$, to the terminal 9c during an interval between a pulse of timing signal $F_1$ and a following pulse of timing signal $F_2$, and to the terminal 9a during an interval between a pulse of timing signal $F_2$ and a following pulse of timing signal $F_0$ of the next frame. As a result, at the timing of FIG. 2, a unique word, $L_F$ code words to be transmitted in one first transmission area and $L_R$ code words to be transmitted in one retransmission area are sequentially sent to a modulator 16 via terminal 9d.

The modulator 16 generates a waveform of a signal 105 based on a data sequence sent from the terminal 9d under the control of the clock synchronous signal 101. The signal 105 is sent to a forward channel, indicated by a dotted line in FIG. 1, via an output terminal 17.

On the other hand, a confirmation signal 107 from a backward channel is received by an input terminal 18. The confirmation signal 107 is then demodulated by a demodulator 19 into a binary signal sequence.

From the binary signal sequence, the confirmation signal discriminating circuit 20 discriminates a block number of a code word and information whether or not the code word has correctly been accepted by the receiver 21. If it is found that a code word has correctly been accepted by the receiver 21, the confirmation signal discriminating circuit 20 sets a confirmation value "0" for the code word stored in the memory 11, while the discriminating circuit 20 sets a confirmation value "1" for the code word if it is found that the code word has not correctly been accepted.

In FIG. 3, an information block with a confirmation value of "(1)" is a block which has not yet received a confirmation signal. However, to simplify control, a temporary confirmation value of "1" is set for such an unconfirmed information block until it actually receives the confirmation signal. Therefore, in the above-mentioned detecting operation, such information block is deemed as a block with an error.

In the receiver 21, the signal 105 from the forward channel is received by an input terminal 22. The signal 105 is input into a demodulator 23 and demodulated into a binary data sequence.

A clock synchronous signal regenerating circuit 24 receives the binary data sequence from the demodulator 23 and generates a clock synchronous signal 109.

A frame synchronous signal regenerating circuit 25 receives the data sequence from the demodulator 23 and the clock synchronous signal 109 from the clock synchronous signal regenerating circuit 24 and generate frame synchronous signals by detecting the unique words among the data sequence. These frame synchronous signals in the receiver 21 correspond to the timing signals $F_0$ and $F_1$ of the transmitter 1. Therefore, the frame synchronous signals of the receiver 21 are represented with the same reference marks as those of the transmitter 1.

A code word synchronous signal regenerating circuit 26 receives the frame synchronous signals $F_0$ and $F_1$ and the clock synchronous signal 109, to divide an interval between a pulse of the signal $F_1$ and a following pulse of the signal $F_0$ into "$L_F+L_R$" segments and generates timing signal $F_B$ for synchronizing respective code words. Though the code word synchronous signal regenerating circuit 26 can generate the timing signal $F_B$ using only one of the frame synchronous signals $F_0$, $F_1$ and the clock synchronous signal 109, it inputs, as was mentioned, both the frame synchronous signals $F_0$, $F_1$ and the clock synchronous signal 109, and uses them to generate a timing signal $F_B$ that hardly loses synchronization even when, for example, noises are generated on the transmission lines. The timing signal $F_B$ corresponds to the timing signals $F_{BF}$ and $F_{BR}$ of the transmitter 1.

An error detecting circuit 27 detects errors, if any, in a data sequence of "n" bits starting from each of pulses the timing signal $F_B$ given by the code word synchronous signal regenerating circuit 26, i.e., in each code word, using CRC symbol.

For code words with no errors detected by the error detecting circuit 27, a block number detecting circuit 28 detects block numbers from outputs of the demodulator 23 under the control of the clock synchronous signal 109. Even if errors have been detected in code words by the error detecting circuit 27, their block numbers may easily be obtained, based on block numbers of the adjacent code words, if the error detected code words are those transmitted in a first transmission area. Therefore, the block number detecting circuit 28 detects block numbers of $L_F$ code words starting from each pulse of the frame synchronous signal $F_1$, i.e., code words transmitted in a first transmission area. However, for the following $L_R$ code words, i.e., code words transmitted in a retransmission area, only block numbers of code words without errors are detected.

For each code word whose block number has been detected by the block number detecting circuit 28, a confirmation signal generating circuit 29 generates a confirmation signal 111. The confirmation signal 111 indicates whether or not errors have been detected in the code word along with a block number of the code word. The signal 111 is converted into a signal 107 by a modulator 30, and transmitted to the backward channel from an output terminal 31.

Concerning code words transmitted in the first transmission areas, the error detection result and block number of every code word are transmitted to the demodulator 19 of the transmitter 1, while, concerning code words transmitted in the retransmission areas, transmission of block numbers and data indicating that the code words have correctly been received by the receiver 21, to the demodulator 19 of the transmitter 1, is done only for code words with no error.

On the other hand, the code words whose block numbers have been detected by the block number detecting circuit 28 are written in a memory 32 with addresses which correspond to the block numbers. The write control circuit 33 controls this writing so that all code words may be written into the memory 32 at specified addresses, except code words whose block numbers have not been detected, namely, code words which have been retransmitted in the retransmission areas, detected to have errors and judged to have failed in retransmission are not written in the memory 32.

To secure the timing of writing into the memory 32, the write control circuit 33 receives the clock synchronous signal 109 and code word synchronous signal $F_B$. Therefore, all code words transmitted in the first transmission areas, i.e., all first received code words, with or without errors, are stored in the memory 32. Concerning a code word which has been failed in a previous transmission and is retransmitted in a retransmission area, it is used to update corresponding erroneous data of the code word in the memory 32 only when the code word is correctly retransmitted.

The memory 32 stores $2^{k-k_0}$ code words. A code word stored in the memory 32 is read out thereof at the same timing of storing a new code word which is transmitted in a first transmission area into the memory 32, a predetermined time after a storing of the code word, the predetermined time being determined by a capacity of the memory 32 and the number of code words written into the memory 32 per unit time.

Namely, when an address of one code word to be written in the memory 32 is "y", the read control circuit 34 reads, at the same timing as the writing, a code word out of the memory 32 at an address "y+1", namely, a code word earliest stored in the memory 32 among the code words currently stored in the memory 32.

To calculate the address "y+1" of the code word to be read, the read control circuit 34 receives the address "y" of the code word to be written in the memory 32 at the moment from the write control circuit 33.

A code word is read out of the memory 32 only when one code word transmitted in a first transmission area is written in the memory 32. When a retransmitted code word is written in the memory 32, no code word is read out of the memory 32.

In this way, code words at the addresses specified by the read control circuit 34 are sequentially output to a destination via an output terminal 35.

To secure the timing of reading each code word out of the memory 32, the read control circuit 34 receives the clock synchronous signal 10, frame synchronous signal $F_1$ and code word synchronous signal $F_B$.

For example, the frame synchronous signal $F_1$ and code word synchronous signal $F_B$ are used to judge whether a code word which is being written the memory 32 at the moment has been transmitted in a first transmission area or in a retransmission area.

By employing the system arrangement and control mentioned in the above, an arbitrary throughput will be achieved. When a time needed for transmitting one unique word, a time needed for transmitting $L_F$ code words in one first transmission area, and a time needed for transmitting $L_R$ code words inn one retransmission area are $t_0$, $T_1$, and $t_2$, respectively, a fixed portion $t_1/(t_0+t_1+t_2)$ in a total transmission time may always be used for firstly transmitting signals away from the information source, independent of the forward channel condition. By setting a ratio $k_0L_F/(t_0+t_1+t_2)$ to be equal to a mean data input speed from the information source, signals from the information source can be transmitted in real time.

In such a reading method of data, if transmission errors occur in a code word and if the code word is not correctly retransmitted within a fixed time period, i.e., within a time period from the moment of storing the code word into a memory of the receiver to a moment of reading the code word out of the memory, the erroneous data of code word is read as it is.

However, even if errors occur in an information block, practically, in almost every case, all bits of the block are not erroneous, only few of them. Signals, such as voice signals and image information signals, which must be transmitted inn real time, may be sensed by a observer normally even if there are few errors in the signal. Namely, the total quality of the received signal is determined by a mean bit error rate. Therefore, the few uncorrected errors, which may occur in this embodiment of the invention, will actually be negligible.

Further, by using the statistical characteristics of information, a proper interpolating process may be employed to remarkably reduce influences of such uncorrected errors.

In addition, by increasing capacities of memories in transmitter and receiver, a maximum retransmission number may be increased to optionally lower the error uncorrected rate.

However, as the capacities of memories increase, transmission delay time lengthens. Therefore, the capacities of memories shall be selected, taking into account factors such as the kind of information to be transmitted and the quality of transmission lines.

Although older code words in the order of storing in the memory 11 or in the order of transmission are given priority in selecting $L_R$ code words to be retransmitted in a retransmission area, ways of giving priority are not limited to those mentioned above. For instance, if the number of code words detected to be retransmitted is $L_r$ which is less than $L_R$, and if there is among such $L_r$ code words a code word which has been retransmitted for "M-1" times in fail, M being the maximum retransmission number, this code word may be further repeatedly selected for "$L_R$-$L_r$" times.

If there is a code word which has been retransmitted for the predetermined maximum retransmission number in fail, this erroneous code word may not be output as it is to a destination. Instead, retransmitted erroneous data of the code word may be used to assume correct data of the code word, and a result of the assumption is output to the destination.

For example, if the code word has failed in transmission for "j" times including its first transmission in a first transmission area and a value of "i"th bit of the code word was "0" for "m" times of repeated transmission and it was "1"for "j-m"times of repeated transmission. Then, if $m \geq j/2$ or $m < j/2$ is satisfied, the "i"th bit of the code word is assumed to be "0" or "1" depending on the satisfied formula.

It is possible to erase data of correctly transmitted information blocks from the memory of the transmitter.

An error correction method and the method of the present invention may be combined to provide an error control signal transmission method. In this case, the encoder 8 adds error correcting and detecting redundant bits, instead of error detecting redundant bits, to each information block. In addition, the error detecting circuit 27 corrects bit errors if they are correctable and, only when the bit errors are uncorrectable, retransmits them according to the method of the present invention. That is, in this case also, a transmission area is divided into the first areas for firstly transmitting signals from an information source and the second areas for retransmitting signals, to secure a fixed throughput. And the number of retransmission is limited to a fixed value to suppress a delay time. It is possible, for example, to correct an error only when the error occurs in one bit of an information block, and, if an error occur in two or more bits, corresponding data of the information block are retransmitted.

This invention is preferable for transmitting information, such as image and voice information which are required to be transmitted in real time. Naturally, the present invention is applicable, for example, for transmitting computer data, for by setting a ratio of $L_R$ to $L_O$ to be sufficiently large, or by setting the maximum retransmission number to be sufficiently large, required transmission reliability can be obtained optionally.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. A method of error control which retransmits a portion of information if an error occurs on the portion in transmitting the information, the method comprising the steps of:
   forming an information block composed of one or a plurality of bits from the information;
   transmitting the information block from transmitter means to receiver means in one of a plurality of first transmission areas, the first transmission areas being arranged at predetermined time intervals on a time axis and each of the first transmission areas having a first predetermined time length;
   judging whether or not an error has occurred on the information block;
   retransmitting, when it is judged that an error has occurred on the information block, the information block from the transmitter means to the receiver means in one of a plurality of second transmission areas, the second transmission areas being arranged alternately with the first transmission areas on the time axis and each of the second transmission areas having a second predetermined time length.

2. The method of claim 1, further comprising the step of:
   outputting an information block in which an error has occurred in the transmission in a first transmission area, to a destination without correcting the error if the information block is not correctly retransmitted within a fixed time period after the transmission in the first transmission area.

3. The method of claim 1, wherein information blocks to be retransmitted in one of second transmission areas are selected such that the earlier the information blocks have been transmitted in the first transmission areas, the more they receive priority in the selection.

4. The method of claim 1, wherein, if a second transmission area has no information blocks to be retransmitted, information blocks which have been transmitted din any of the first transmission areas preceding the second transmission area and are not yet confirmed whether or not they have correctly been received by the receiver means are selected and transmitted in the second transmission area.

5. The method of claim 1, wherein a value obtained by dividing the number of information bits which can be transmitted in each first transmission area by a time necessary for transmitting one frame comprising a first transmission area and a second transmission area is set to be equal to or more than an average number of bits input per unit time from an information source.

6. The method of claim 1, wherein a ratio of the second predetermined time length to a sum of the first and second predetermined time lengths is substantially equal to the probability of error occurring on at least one bit in transmitting one information block.

7. The method of claim 1, wherein, if the number of information blocks to be retransmitted in a second transmission does not reach the maximum number of information blocks which can be transmitted in the second transmission area, the information blocks to be retransmitted in the second transmission area are repeatedly selected such that the earlier the information blocks have been transmitted in the first transmission areas, the more they receive priority in the selection.

8. A method of error control which retransmits a portion of information if an error occurs on the portion in transmitting the information, the method comprising the steps of:
   forming an information block by adding error control information to a piece of information;
   transmitting the information block from transmitter means to receiver means in one of a plurality of first transmission areas, the first transmission areas being arranged at predetermined time intervals on a time axis and each of the first transmission areas having a first predetermined time length;
   judging whether or not an error has occurred on the information block, the judgment being made with the use of the added error control information; and
   retransmitting, when it is judged that an error has occurred on the information block, the information block from the transmitter means to the receiver means in one of a plurality of second transmission areas, the second transmission areas being arranged alternately with the first transmission areas on the time axis and each of the second transmission areas having a second predetermined time length.

9. The method of claim 8, wherein the error control information includes error detecting information and error correcting information, and the error occurred in the information block during transmission in one of the first transmission areas or in one of the second transmission areas is corrected by using the error correcting information and no retransmission of this information block is carried out if the error is correctable by using the error correcting information, while, if the error is not correctable by using the error correcting information, this information block is retransmitted.

10. A method of error control which retransmits a portion of information if an error occurs on the portion in transmitting the information, the method comprising the steps of:
    receiving signals from an information source;
    sequentially forming information blocks from the signals received from the information source;
    sequentially storing the information blocks in storage means disposed in transmitter means, and, transmitting the information block from the transmitter means to receiver means in one of a plurality of first transmission areas, the first transmission areas being arranged at predetermined time intervals on a time axis and each of the first transmission areas having a first predetermined time length;
    sequentially storing the information blocks transmitted in the first transmission areas in storage means disposed in the receiver means and judging whether or not errors have occurred on the information blocks;

transmitting results of the judgment to the transmitter means and storing the results in the storage means of the transmitter means;

detecting information blocks in the storage means of the transmitter means, the information blocks to be detected being those which have been judged to have transmission errors and are to be retransmitted in a second transmission area, the maximum number of the information blocks to be detected being limited to a number of information blocks which can be transmitted in the second transmission area;

retransmitting the detected information blocks in a second transmission area which starts just after the completion of the detection;

updating, if the information blocks have correctly been retransmitted in the second transmission area, data of the information blocks stored inn the storage means of the receiver means according to data of the information blocks which have been correctly retransmitted; and sequentially reading the information blocks in the order of storage out of the storage means of the receiver means each time information blocks transmitted in the first transmission areas are stored in the storage means of the receiver means, and outputting the read information blocks to a destination.

11. An error control system for retransmitting a portion of information if an error occurs on the portion in transmitting the information, the system comprising:

transmitter means for transmitting information, the transmitter means including means for forming an information block by adding error control information to each piece of information sent from an information source, and means for transmitting the information block in one of a plurality of first transmission areas, the first transmission areas being arranged at predetermined time intervals on a time axis and each of the first transmission areas having a first predetermined time length;

receiver means for receiving the information block transmitted from the transmitter means, the receiver means including means for judging whether or not an error has occurred on the information block with the use of the error control information contained in the information block, and means for sending a retransmission request for retransmitting an information block which has been judged error to said transmitter means; and to have an means for retransmitting an information block for which a retransmission request has been made, from said transmmitter means to said receiver means in one of a plurality of second transmission areas, the second transmission areas being arranged alternately with the first transmission areas on the time axis and each of the second transmission areas having a second predetermined time length.

12. The apparatus of claim 11, further comprising:

means for outputting information block in which an error has occurrred in the transmission in a first transmission area, to a destination without correcting the error if the information block is not correctly retransmitted within a fixed time period after the transmission in the first transmission area.

* * * * *